(12) United States Patent
Barnes et al.

(10) Patent No.: US 12,234,096 B2
(45) Date of Patent: Feb. 25, 2025

(54) CHUTE LINER

(71) Applicant: Metso Outotec Finland Oy, Tampere (FI)

(72) Inventors: Martin James Barnes, New Lambton Heights (AU); Liam Michael Elliott Fry, Brabham (AU); Heath Sewell, Wallsend (AU)

(73) Assignee: METSO OUTOTEC FINLAND OY, Tampere (FI)

( * ) Notice: Subject to any disclaimer, the term of this patent is extended or adjusted under 35 U.S.C. 154(b) by 0 days.

(21) Appl. No.: 17/928,969

(22) PCT Filed: Jun. 2, 2021

(86) PCT No.: PCT/AU2021/050546
§ 371 (c)(1),
(2) Date: Dec. 1, 2022

(87) PCT Pub. No.: WO2021/243408
PCT Pub. Date: Dec. 9, 2021

(65) Prior Publication Data
US 2023/0322492 A1    Oct. 12, 2023

(30) Foreign Application Priority Data
Jun. 2, 2020 (AU) ................................ 2020901815

(51) Int. Cl.
*B65G 11/16* (2006.01)
(52) U.S. Cl.
CPC .................................. *B65G 11/166* (2013.01)
(58) Field of Classification Search
None
See application file for complete search history.

(56) References Cited

U.S. PATENT DOCUMENTS

| 4,846,615 A * | 7/1989 | Forsyth ..................... F16B 2/14 403/374.2 |
| 2010/0127109 A1 | 5/2010 | Moller et al. |
| 2015/0191310 A1 | 7/2015 | Benjamin |

FOREIGN PATENT DOCUMENTS

| AU | 2015100153 A4 | 3/2015 |
| AU | 2015100154 A4 | 3/2015 |

(Continued)

OTHER PUBLICATIONS

Machine Translation, KR100894185B1, retrieved from FIT Database (Year: 2009).*

(Continued)

*Primary Examiner* — William R Harp
(74) *Attorney, Agent, or Firm* — Andrus Intellectual Property Law, LLP

(57) ABSTRACT

The disclosure relates to a chute liner for mounting on a shelf of a material transfer chute. The shelf has at least one locking formation aperture formed therein. The chute liner has a base for mounting on the shelf. The base has an operatively upper surface that comes into contact with material passing through the chute and an opposed operatively lower surface. The base has at least one mounting formation that depends from the operatively lower surface of the base that defines a passage which in use is passed through the locking formation aperture in the shelf. The chute liner also has a locking member passed through the passage until it operatively engages the mounting formation to lock the base to the shelf.

23 Claims, 11 Drawing Sheets

(56) References Cited

FOREIGN PATENT DOCUMENTS

DE            3234379 A  *  3/1984  ........... B65G 11/166
DE            4314512 A1   11/1994
KR        100894185 B1  *  4/2009

OTHER PUBLICATIONS

Machine Translation, DE3234378A, retrieved from Espacenet (Year: 1984).*
International Search Report and Written Opinion for PCT Application No. PCT/AU2021/050546, mailed Jun. 30, 2021.
International Preliminary Report on Patentability for PCT Application No. PCT/AU2021/050546, dated Sep. 13, 2022.
Written Opinion of the International Preliminary Examining Authority for PCT Application No. PCT/AU2021/050546, dated Dec. 21, 2021.

* cited by examiner

CHUTE LINER

CROSS-REFERENCE TO RELATED APPLICATIONS

This application is the U.S. national stage application of International Application PCT/AU2021/050546, filed Jun. 2, 2021, which international application was published on Dec. 9, 2021, as International Publication WO 2021/243408 A1 in the English language. The International Application claims priority of Australian Patent Application No. 2020901815 filed Jun. 2, 2020.

FIELD

The invention relates generally to chute liners for a chute having spaced apart shelves that facilitates rock-on-rock contact during use.

More particularly the invention relates to a chute liner, and to a shelf and liner arrangement for a chute. The disclosure also extends to a shelf for a chute liner, and a chute having the disclosed shelf and chute liner arrangement. Finally, the invention also extends to a method of fitting a chute liner to a shelf of a chute and a method of replacing a worn chute liner in a chute with shelves, with a replacement chute liner.

CROSS REFERENCE TO RELATED APPLICATIONS

The contents of AU 2015100153 and AU 2015100154 are incorporated into the specification of the current application by direct cross reference.

Definitions

In the description and claims, the term "chute with shelves" shall be understood to mean a chute of the type having a plurality of rows of vertically spaced shelves or ledges that project transversely away from a wall of the chute. The spaced shelves receive and hold up rock material being passed through the chute so as to achieve 'rock on rock' contact which reduces wear of the chute liner being used.

In the description and claims, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

In the description and claims, by the terms "operatively engages" or "operative engagement" is meant that the section configured to pass through the passage engages the passage in the mounting formation such that the locking member holds the base in position on the shelf during operational use.

In the description and claims, by the terms "operatively upper surface" is meant that the surface faces upwards in operational use for contact with the material passing through the chute and by "operatively lower surface" is meant that the surface faces downward in operational use such that it sits on the shelf.

BACKGROUND

Material handling chutes are typically used to provide a controlled flow of particulate material from an upper feed point, such as an upper conveyor, onto a lower delivery point such as a lower conveyor, or into a storage bin.

Conventional chutes are known as hood and spoon style chutes. The chute walls are lined with sacrificial wear liners or tiles that lie flat against the wall. The sacrificial liners may be made from several different materials including rubber, ceramics, polyurethane, polyethylene, or metallic material. The liners may be fixed to the walls using liner bolts that extend through the wall, or by welding the liner or adhering the liner to the wall. The liners need to be regularly inspected for wear, and worn liners need to be periodically replaced.

Another type of chute does not have a series of liners mounted directly on the wall but instead has a series of vertically spaced apart shelves (a chute with shelves). Each of the vertically spaced apart shelves may step inwardly relative to the shelf directly above it so the chute tapers inward in a direction down the chute. A series of removable chute liners are mounted on the shelves which contact broken rock material, such as rock or mineral ore, passing through the chute. Each chute liner has a base mounted on the shelf and an arm extending up and away from the base to a free end.

In use, each shelf and its associated chute liner retains a portion of the rock material entering the chute on the liner. Once the chute liner and shelf is initially filled with rock material, the stream of rock material passing through the chute makes contact with and is guided by the retained portion of rock material. The retained portion of rock material on the liners, which tapers inward in a downward direction, in effect, forms a tapered lining of rock material through which the stream of broken material passes.

In the industry, this is known as 'rock-on-rock' material flow because the retained portion of material forms a primary liner and the slope or tapering of the chute controls the flow rate of the passing material. The 'rock-on-rock' technology significantly reduces the wear of the liners on the shelves when compared with conventional chute and liner arrangements where the liners lie flat against the wall. In some examples, the improvement in wear performance has been up to 400%.

Whilst the 'rock-on-rock' contact forms a primary liner for the chute and attenuates wear of the chute liners, the removable liners are still subject to wear. In particular, the arms of the liners are subject to wear towards their free ends and need to be periodically replaced.

The replacement of liners in a chute requires the flow of material through the chute to be stopped or shutdown thereby interrupting production. These shutdowns reduce the productivity of a plant and cost money. Thus, any innovation which reduces the downtime required for the maintenance of the liners in a material transfer chute would improve the productivity of a plant and be advantageous.

The reference to prior art in the background above is not and should not be taken as an acknowledgment or any form of suggestion that the referenced prior art forms part of the common general knowledge in Australia or in any other country.

SUMMARY OF DISCLOSURE

Applicant recognizes that it would be beneficial if worn liners on a chute with shelves could be replaced more efficiently.

According to one aspect of the invention there is provided a chute liner for mounting on a shelf of a chute including at least one locking formation aperture formed therein, the chute liner comprising:

a base for mounting on the shelf and an arm extending away from the base to a free end, the base having an operatively lower surface and an opposed operatively upper surface that contacts material passing through the chute, the base and arm being configured to retain a portion of material passing through the chute thereon, at least one mounting formation defining a passage there through depending from the operatively lower surface of the base, the mounting formation being passed through the locking formation aperture in the shelf in use; and a locking member which is displaced into the passage of the mounting formation in use to operatively engage the mounting formation and lock the base to the shelf.

A plurality of different mechanisms may be used to achieve an operative engagement of the locking member to the mounting formation that is suitable for locking the chute liner to the shelf.

The section of the locking member may have a complementary configuration to the passage in the mounting formation for operatively engaging the passage in the mounting formation with a frictional grip.

The section of the locking member may be a tapered section that is frictionally received in the passage of the mounting formation.

The section of the locking member may be made of a resilient material, for example, be a resilient polymeric material such as polyurethane, which permits it to undergo deformation when it is driven into the passage. Driving the locking member into the passage deforms and compresses the resilient material which creates a static frictional force that holds the locking member in position in the passage and resists its removal therefrom.

The locking member may have a head at one end and a smaller opposite end that is sized to be received in the passage with clearance.

The tapered section of the locking member may form a wedge which may be driven into the passage by striking the head of the locking member. Further, displacement of the wedge into the passage beyond initial engagement of the wedge with the mounting formation will cause deformation of the resilient material increasing the frictional force locking the wedge to the mounting formation.

Optionally, the entire locking member may be formed from a resilient material.

In another form, the tapered section of the locking member may be formed from a non-resilient material, e.g. steel, which is not deformed when it is inserted into the passage. In this form, the tapered section and the passage may be configured so that the tapered section and the mounting formation are geometrically engaged when the tapered section is driven a certain distance into the passage.

Optionally, the section of the locking member may be configured to pass fully through the passage.

The passage of the mounting formation may have four sides and the mounting formation that projects beneath the shelf in use may form three sides thereof, and an underside of the shelf may form a fourth side.

The tapered section of the locking member which is passed into the passage may form a wedge having four sides having a cross-sectional configuration complementary to the passage.

One of the four sides of the wedge may extend parallel to the longitudinal axis of the locking member and, in use, this side may be arranged to bear up against the shelf, and lie flat up against the shelf, and the other three sides of the wedge may taper inwardly along the length of the wedge.

The wedge may comprise a frustum of an oblique rectangular pyramid.

Instead, only one side of the locking member may be tapered, providing a single wedge geometry rather than a double wedge geometry.

Further, optionally, the passage formed in the mounting formation may be tapered along at least part of its length, e.g. to enhance the engagement with the locking member when it is inserted into the passage.

The locking member may include a retaining arrangement towards its free end opposite the head end that is passed through the locking member for retaining the locking member within the passage of the mounting formation.

The retaining arrangement may comprise a plurality of openings formed through the locking member at spaced intervals along its length, and a retainer, such as a retaining clip, that can be inserted through an opening to retain the locking member in position in the mounting formation.

The chute liner may further comprise a base engagement formation spaced inward from the mounting formation for engagement with a shelf retainer on the shelf to lock the chute liner down on the shelf during use of the chute.

The shelf retainer may comprise a channel member extending the length of the liner forming a receptacle, and the base engagement formation may extend the length of the liner and be configured for being tightly and snugly received within the receptacle.

The chute liner may comprise two laterally spaced sides having a longitudinal axis extending between the sides, and inner and outer ends joining the laterally spaced sides. Further, each said one mounting formation may be arranged with its passage extending parallel to the longitudinal axis of the chute liner. Put another way, the passage extends parallel to the inner and outer ends of the of the chute liner.

The subsidiary features described above relate to a first embodiment of the chute liner and the subsidiary features of a second embodiment will be described below.

In the second embodiment, the chute liner may include a linked further mounting formation closely spaced from and aligned with said one mounting formation on the base, and having a locking member aperture formed therein through which the locking member that is received in the passage of the mounting formation is passed (i.e. it receives the same locking member that is also passed through the passage of the mounting formation).

The locking member may comprise a fastener and a separate block that is releasably coupled to the fastener to mechanically lock the mounting formation to the shelf.

The block may be passed though the passage of the mounting formation, and the fastener may be passed through the locking member aperture in the linked further mounting formation, and the block and fastener may be releasably coupled to each other in a way that enables the block to be axially displaced relative to the fastener.

The fastener may comprise a head that is retained by the locking member aperture on the linked further mounting formation and a shank having a screw thread formed thereon, and the block may define an internal bore having an internal screw thread that receives the screw thread on the fastener to enable the block to be displaced towards the fastener to tighten the locking member.

The block may be a tapered block, and the tapered block may be configured in the form of a wedge, and rotation of the fastener may draw the block into the passage of the mounting formation to tightly engage the mounting formation and lock the chute liner to the shelf.

Rotation of the fastener in one direction displaces the locking member axially relative to the block and draws the block into the passage of the mounting formation forming a geometric lock locking the locking member to the mounting formation.

Optionally, the block of the locking member may be formed from a resilient material that can undergo elastic deformation within the passage of the mounting formation.

Instead, the block of the locking member may be formed of a non-resilient material.

Further, optionally, the block may have a substantially constant cross-section and the passage may be tapered along its length.

Further, optionally, the passage and the block may be configured to have complementary tapered sections.

In the second embodiment, the chute liner comprises two laterally spaced sides having a longitudinal axis extending between the sides, and inner and outer ends joining the laterally spaced sides, and each said one mounting formation and linked further mounting formation may be arranged with their passages extending transverse to the longitudinal axis of the chute liner. That is, the passages extend in a direction from the inner end to the outer end of chute liner.

In both the first and second embodiments described above, the base may comprise two said mounting formations spaced apart from each other in the direction of the longitudinal axis, and each mounting formation may have a said locking member associated therewith.

For example, one mounting formation may be positioned towards one side of the liner and the other mounting formation may be positioned towards the other side of the liner.

Further, the mounting formations may be positioned towards the outer end of the chute liner.

In either of the first and second embodiments described above, the mounting formation/s may be integrally formed with the chute liner.

Alternatively, in either the first and second embodiments, the mounting formation/s may be formed separately from the chute liner and be configured to be received within a complementary passage formed in the base of the chute liner and project out through the operatively lower surface thereof.

In the case where the mounting formation is formed separately, the mounting formation will be configured such that it cannot be drawn through the passage formed in the base of the chute liner.

According to another aspect of the invention there is provided a shelf and liner arrangement for a chute with shelves, the shelf and liner arrangement comprising:
 a shelf having an inner end mounted on a chute wall and a free outer end spaced away from the chute wall, the shelf having at least one locking formation aperture formed therein; and
 a chute liner mounted on the shelf, comprising:
  a base mounted on the shelf and an arm extending away from the base to a free end, the base having an operatively lower surface and an opposed operatively upper surface that contacts material passing through the chute, the base and arm being configured to retain a portion of material passing through the chute thereon during operation of the chute, at least one mounting formation defining a passage there through depending from the operatively lower surface of the base, the mounting formation being passed through the locking formation aperture in the shelf; and
  a locking member that is received in the passage and operatively engages the mounting formation to lock the chute liner on the shelf.

In a first embodiment of the invention, the section of the locking member has a complementary configuration to the passage in the mounting formation to operatively engaging the passage in the mounting formation with a frictional grip.

The section of the locking member may be a tapered section to enable the locking member to frictionally engage the mounting formation when received in the passage.

Further, the section of the locking member may be formed of a resilient material.

The locking member may have a head at one end and a smaller opposite end that is sized to be received in the passage of the mounting formation with clearance.

The shelf may include a liner retainer spaced in from its free outer end, and the chute liner may further include a base engagement formation on the base, e.g. towards the inner end of the shelf, and the base engagement formation may be engaged by the liner retainer and held down on the shelf to assist in locking the chute liner on the shelf.

The liner retainer may comprise a channel member extending from one side of the shelf to the other forming a receptacle within which the base engagement formation is received in use. In one embodiment, the shelf retainer comprises an L-shaped channel which extends the longitudinal length of the chute liner and opens, e.g. sideways or horizontally, towards the chute liner.

The base engagement formation may be configured to complement the receptacle formed by the liner retainer and be tightly and snugly received therein.

The subsidiary features described above relate to a first embodiment of the shelf and liner arrangement, and the subsidiary features of a second embodiment will be described below.

In the second embodiment, the shelf and liner arrangement may include a linked further mounting formation closed spaced from and aligned with said at least one mounting formation on the base, the linked further mounting formation having a locking member aperture formed through which said locking member that is received in the passage of the mounting formation is passed.

The locking member may comprise a fastener and a separate block that is releasably coupled to the fastener to mechanically lock the mounting formation to the shelf.

The block may be passed though the passage of the mounting formation, and the fastener may be passed through the locking member aperture, and the block and fastener may be releasably coupled to each other such that the block can be axially displaced relative to the fastener.

The chute liner of the shelf and liner arrangement may include any one or more of the other features of the chute liner described in a preceding aspect of the invention.

The disclosure also extends to a shelf for use in the disclosed liner and shelf arrangement.

The shelf may include an inner end mounted on a chute wall and a free outer end spaced away from the chute wall, and at least one locking formation aperture formed therein.

The at least one locking formation aperture may be positioned on the shelf to align with an associated mounting formation on the chute liner so the mounting formation passes through the at least one locking formation aperture.

The shelf may comprise two locking formation apertures formed therein that are laterally spaced apart from each other.

The shelf may have two sides joining the inner and outer ends and one locking formation aperture may be positioned towards one side of the shelf and the other locking formation aperture may be positioned towards the other side of the shelf.

The shelf may further include a liner retainer for receiving a base engagement formation on the base of the chute liner for positioning the liner on the shelf and holding the liner down on the shelf during operation of the chute.

The liner retainer may comprise a channel member forming a receptacle for receiving the base engagement formation on the liner. Optionally, the liner retainer may be in the form of an L-channel which extends the length of the chute liner and opens sideways towards the chute liner.

The shelf may optionally further include alignment formations for aligning the liner with the shelf.

According to another aspect of the invention there is provided a material transfer chute including a substantially upright chute wall, a plurality of rows of shelves arranged on the wall projecting transversely out from the chute wall, and at least one chute liner mounted on each shelf in accordance with any one of the preceding aspects of the invention.

In particular, the chute liner may include any one or more of the optional features of the chute liner described in a preceding aspect of the invention. Similarly, the shelf may include any one or more of the features of the shelf described in a preceding aspect of the invention.

According to another aspect of the invention there is provided a material transfer chute including a substantially upright chute wall, a plurality of rows of shelves arranged on the wall projecting transversely out from the chute wall, and at least one shelf and chute liner arrangement on each shelf in accordance with any one of the preceding aspects of the invention.

In particular, the shelf and liner arrangement may include any one or more of the optional features of the shelf and liner arrangement described in any preceding aspect of the invention.

According to another aspect of the invention there is provided a method for installing a chute liner on a shelf of a chute, the method comprising:
 providing a chute liner in accordance with a preceding aspect of the invention; mounting the chute liner in position on the shelf with the or each mounting formation passed through the at least one locking formation aperture; and
 passing a locking member into the passage of the or each mounting formation, and operatively engaging the locking member with the or each mounting formation to lock the chute liner in position on the shelf during operation of the chute.

Operatively engaging the locking member with the or each mounting formation may include engagement by means of a frictional grip. Operatively engaging the locking member may also include engagement by means of a geometric lock, e.g. by using a tapered section on a locking member.

Instead, operatively engaging the locking member with the or each mounting formation may include engagement by using a mechanical lock.

The chute liner may further include any one or more of the optional features of a chute liner described in a preceding aspect of the invention.

According to another aspect of the invention there is provided a method for fitting a chute liner to a shelf of a chute, the method comprising:
 providing a chute liner comprising:
  a base and an arm extending away from the base to a free end, the base having an operatively lower surface and an opposed operatively upper surface, the base and the arm being configured to retain a portion of material thereon;
  at least one mounting formation defining a passage there through and a linked further mounting formation defining a locking member aperture therein, said one and linked further mounting formations depending from the operatively lower surface of the base and being aligned with each other; and
  a locking member that is sized to be passed through said one and further linked mounting formations;
 mounting the chute liner in position on the shelf having an inner and outer end with the or each mounting formation passed through the locking formation aperture, and the linked further mounting formation abutting the outer end of the shelf; and
 passing a locking member through the passage in the or each mounting formation and through the locking member aperture in the or each further linked mounting formation and operatively engaging the respective mounting formations to lock the chute liner to the shelf.

The locking member may comprise a fastener and a separate block that is releasably coupled to the fastener and locking the chute liner to the shelf may include displacing the block axially relative to the fastener.

The fastener may have a head that is retained by the locking member aperture on the linked further mounting formation and a shank having a screw thread formed thereon, and the block may define an internal bore having an internal screw thread therein, and operatively engaging the respective mounting formations to lock the chute liner to the shelf may include displacing the block axially relative to the fastener by screwing the fastener into the block.

The block may be tapered, e.g. it may be configured in the form of a wedge and displacing the block axially relative to the fastener may include drawing the block into the passage of the mounting formation.

According to another aspect of the invention there is provided a method for fitting a chute liner to a shelf of a chute, the method comprising:
 providing a chute liner in accordance with a second embodiment of the first aspect of the invention;
 mounting the chute liner in position on the shelf with the or each mounting formation passed through the locking formation aperture and the linked further mounting formation abutting an outer end of the shelf;
 passing the fastener through the fastener aperture in the linked further mounting formation and positioning the block on a side of the mounting formation passage remote from the locking member aperture; and
 releasably coupling the block to the fastener and displacing the block relative to the fastener to draw the block into the mounting formation passage and mechanically lock the chute liner to the shelf and hold it in position during operation of the chute.

The chute liner may include any one or more of the features of the chute liner described in any preceding aspect of the invention.

According to another aspect of the invention there is provided a method of replacing a worn chute liner in a chute with shelves with a replacement chute liner, the method comprising removing the worn liner from the shelf by withdrawing each locking member from the passage of its associated mounting formation, lifting the chute liner off the shelf by withdrawing each mounting formation from its associated locking formation aperture, and then fitting a replacement chute liner to the shelf as described in any of the preceding aspects of the invention.

The chute liner may include any one or more of the optional or preferred features of the chute liner described in a preceding aspect of the invention.

Further, any of the features described in one of the preceding aspects of the disclosure can be combined with any one of the other aspects of the disclosure defined above.

BRIEF DESCRIPTION OF DRAWINGS

Preferred features, embodiments and variations of the disclosure may be discerned from the following Detailed Description which provides sufficient information for those skilled in the art to perform the disclosure. The Detailed Description is not to be regarded as limiting the scope of the preceding Summary of Disclosure in any way. The Detailed Description makes reference to a number of drawings in which.

DETAILED DESCRIPTION

Figure 1:
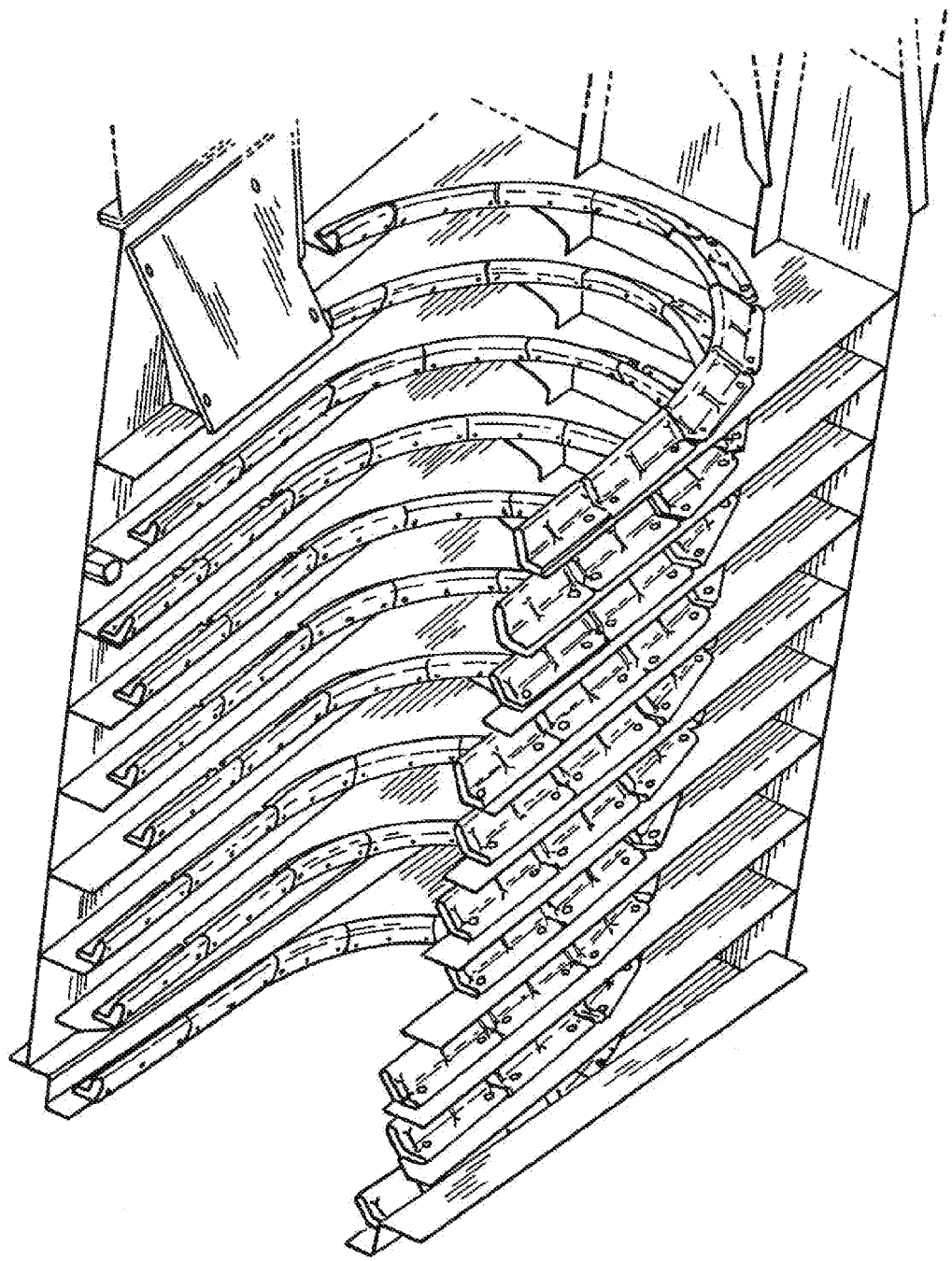
FIG. 1 illustrates a prior art material transfer chute having a chute liner and shelf arrangement that is used on the chute.

FIG. 1 provides an overview of a material transfer chute with shelves of the type to which this invention is applied.

The chute has several rows of shelves each extending in from a wall of the chute. Further, the shelf arrangements extend incrementally further into the chute in a direction down through the chute. Each shelf arrangement has an inner end that is mounted on the wall of the chute and a free outer end that projects into a flow passage defined through the chute.

Chute liners are mounted on each of the shelves and each liner has an inner end that is mounted on a shelf towards the chute wall and an outer end outward of the outer end of the shelf. Further, each chute liner comprises a base which is mounted on a shelf and an arm extending up and away from the base to a free end projecting into the flow passage. The chute liner has strengthening webs or ribs at spaced intervals across its width that stiffen the arms and help them to maintain their upstanding orientation when subject to load in use.

The base of the chute liner is planar so that it can lie on a shelf which is also planar. However, the arm or flange extends away from the base at an obtuse angle as shown in the drawings. The base of the chute liner mounts the liner efficaciously on the shelf and the function of the arm is to make contact with rock material passing through the flow passage. The arm holds up some of the rock material forming a stationary rock layer. The broken rock that is moving through the flow passage then makes contact with the stationary rock being held by the arms. It does not directly contact the chute liner thereby reducing wear of the chute liners. However, over time with extended operation of the chute, the free ends of the arms are worn down by the passing broken rock material reducing their ability to hold up the rock, and they need to be replaced.

Figure 2:
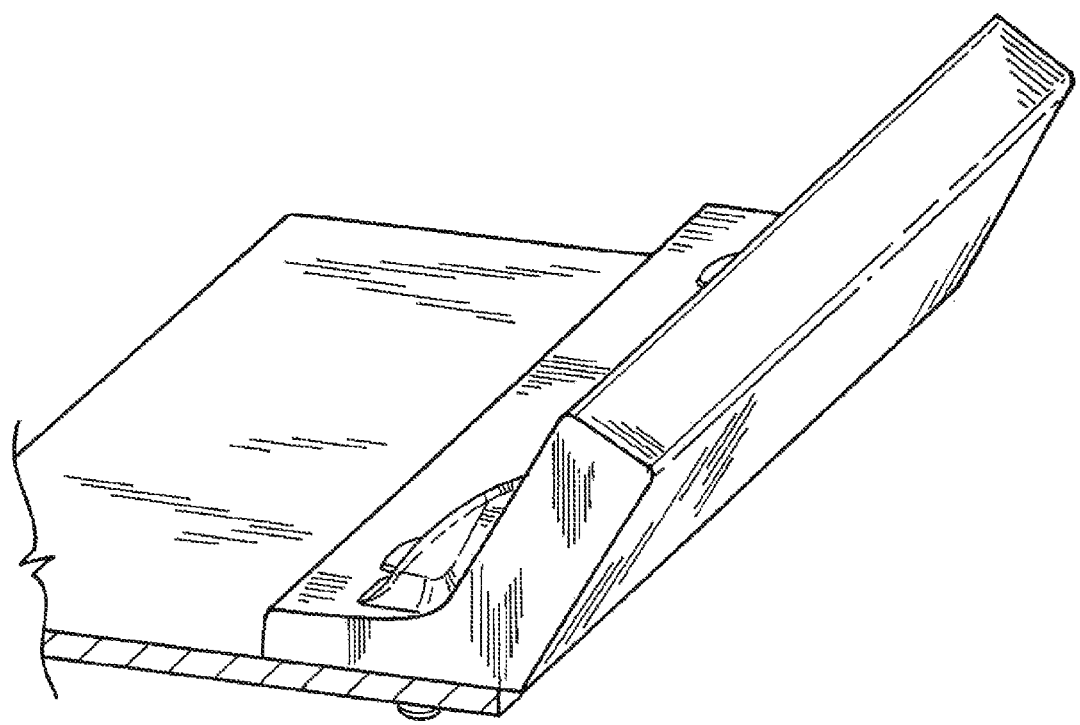
FIGS. 2 and 3 illustrate a prior art chute liner and shelf arrangement that is used on the chute of FIG. 1.
Figure 3:
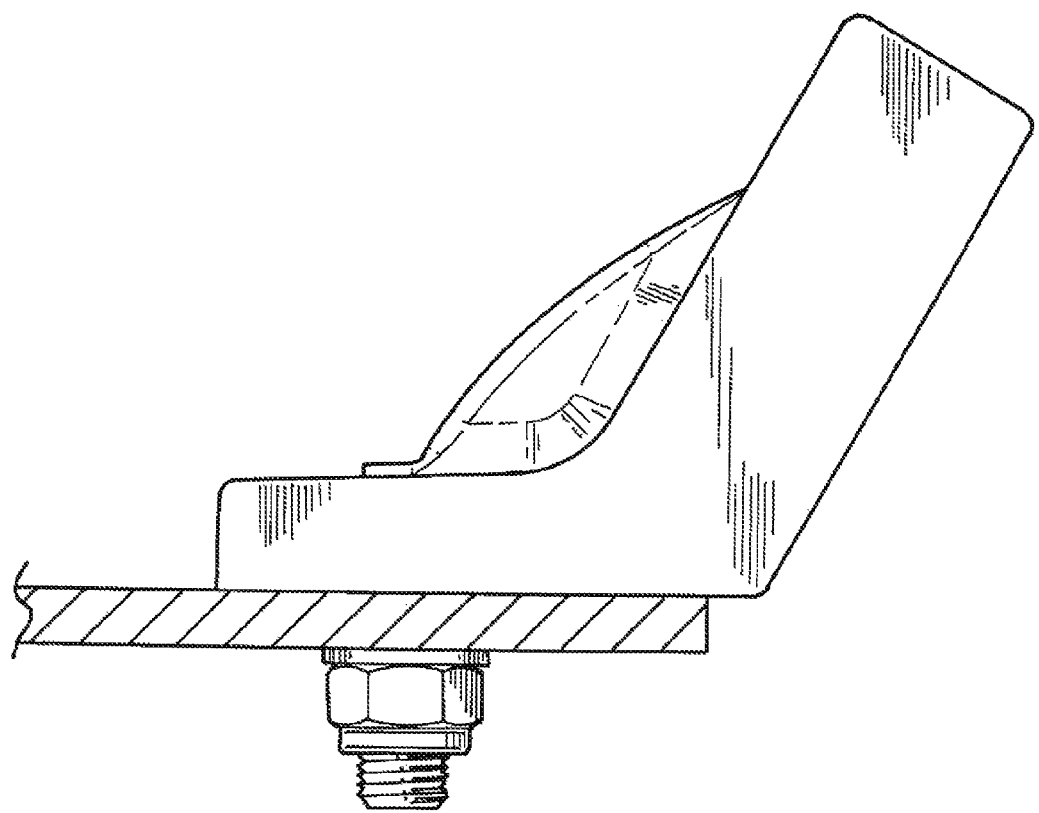

As can be seen in FIGS. 2 and 3, the chute liner is mounted on a shelf by means of a fastener which passes first through the chute liner from above and then through a mounting aperture formed in the shelf. The fastener is secured by a nut mounted on the fastener below the shelf to securely lock the chute liner on the shelf. The head of the fastener lies on an operatively upper surface of the chute liner where it contacts broken rock material and it needs to be accessed from above during maintenance.

To replace a liner on this chute, the nut of the fastener is accessed by a worker from below the shelf. The nut is turned to displace it to the free end of the fastener and detach it from the fastener. The fastener then needs to be withdrawn from the liner and the shelf by the worker from above the shelf. However, the upper surface of the liner which contacts the broken rock material is likely to be buried in compacted rock from operation of the chute. In such an environment, it may not be easy for a maintenance worker to remove the fastener.

FIGS. 4 to 10 illustrate a shelf and chute liner arrangement in accordance with a first embodiment of the disclosure.

In these Figures, the shelf and liner arrangement for a chute is indicated generally by the reference numeral 10. The shelf and liner arrangement 10 comprise broadly a shelf 12 and a chute liner 20.

The shelf 12 has an inner end 14 that, in use, is mounted on a chute wall and a free outer end 16 spaced away from the chute wall. The shelf 12 has two sides 22 and 24 laterally spaced from each other joining the inner and outer ends 14 and 16 and a pair of locking formation apertures 26, 28 formed therein. The pair of locking formation apertures 26, 28 are laterally spaced away from each other, one each towards each side 22, 24 of the shelf 12.

The chute liner 20 is mounted on the shelf 12 and includes a base 30 mounted on the shelf 12 and an arm 32 extending away from the base 30 to a free outer end 34 spaced away from the base 30. The chute liner has two laterally spaced sides 35, 37 joining its inner and outer ends.

The base 30 has an operatively upper surface 31 that contacts material passing through the chute and an opposed operatively lower surface 33 that faces down onto the shelf 12. The base 30 has a free inner end 36 extending towards the inner end 14 of the shelf 12, an outer end 38 that extends a short distance beyond the outer end 16 of the shelf 12.

The chute liner 20 has two spaced mounting formations 40, 42 depending down from the operatively lower surface 33 of the base 30 through the locking formation apertures 26, 28. Each mounting formation 40, 42 projects out beneath the shelf 12 and defines a passage 39 there through that is used to lock the chute liner 20 to the shelf 12.

The chute liner 20 further includes a locking member 50 that is received within the passage 39 of each mounting formation 40, 42. Each locking member 50 has a section which is tapered that passes through the passage 39 which is frictionally engaged with the mounting formation 40 to lock the chute liner 20 to the shelf 12.

The shelves 12 may be made of steel and be of generally rectangular construction as shown in the drawings. The distance between the lateral sides 22, 24 of each shelf is greater than the distance between the inner and outer ends 14, 16 so a longitudinal dimension or longitudinal axis extends from one side 22 to the other side 24. A longitudinal axis of the chute liner 20 extends from one side 35 of the chute liner to the other side 37. The shelf 12 further include one or more shelf supports (not shown) that extend from an underside of the shelf 12 down to the chute wall and provide vertical support or load support for the shelf 12. As the shelf supports do not form part of the invention disclosed in this disclosure, they will not be discussed in further detail in this description.

The chute liner 20 may be manufactured in a similar way to the chute liner described in the prior art and may, for example, be formed by casting a chrome body. Further, the chute liner 20 may have a plurality of stiffening ribs 48 extending between the base 30 and the arm 32 spaced in from the respective sides 35, 37. Again, these are similar to those on the liner illustrated in FIGS. 2 and 3.

Figure 4:
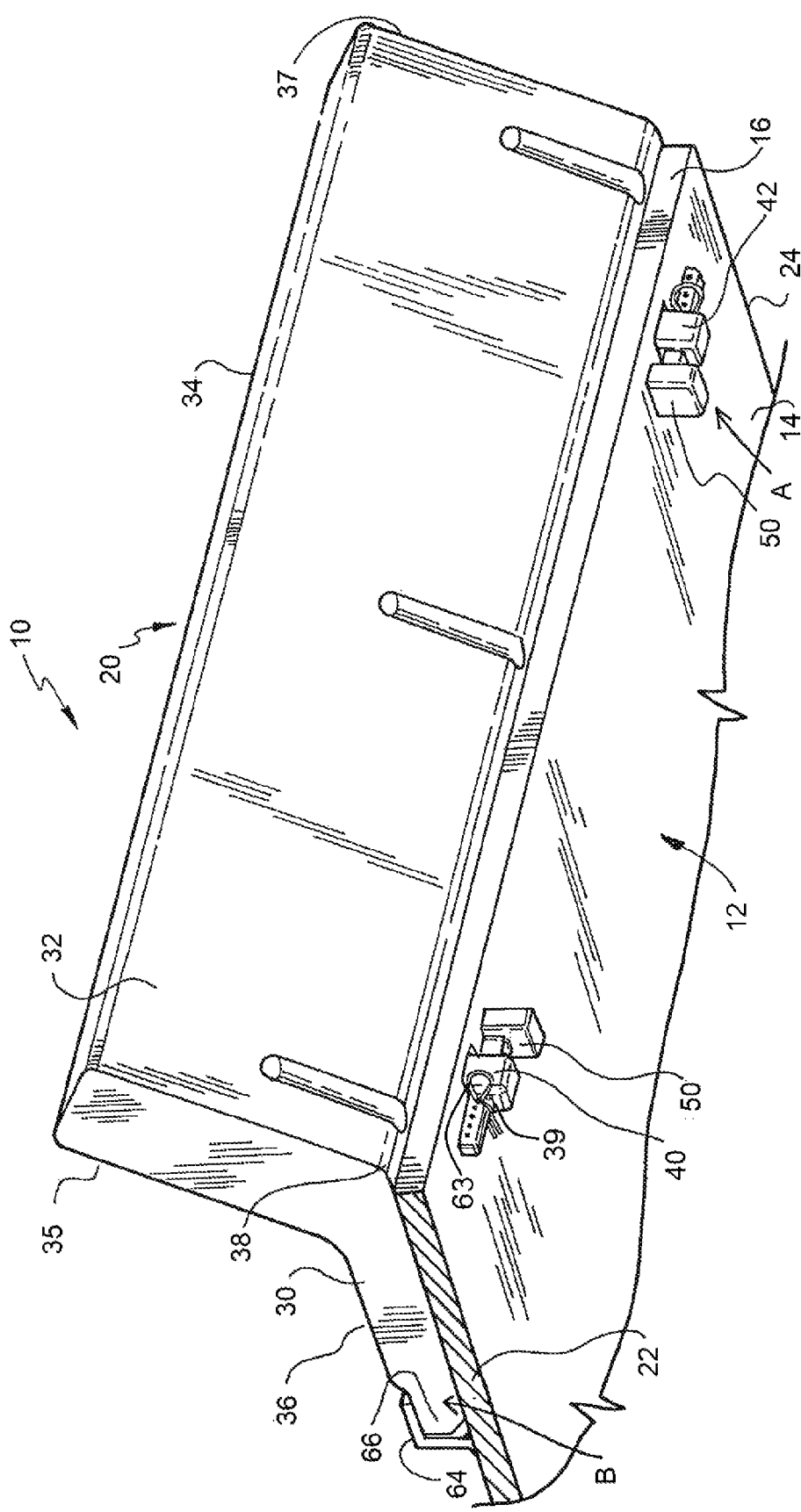
FIG. 4 is a bottom perspective view of a shelf and liner arrangement in accordance of one embodiment of the disclosure.
Figure 5:
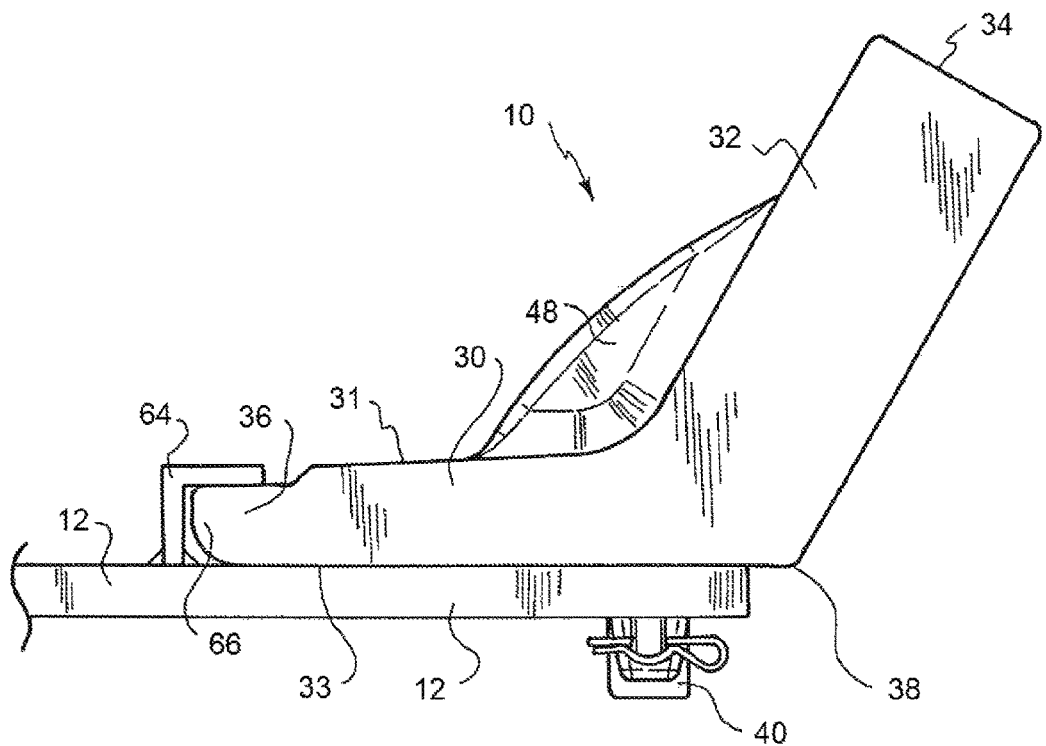
FIG. 5 is a side view of the shelf and liner arrangement as shown in FIG. 4.
Figure 6:
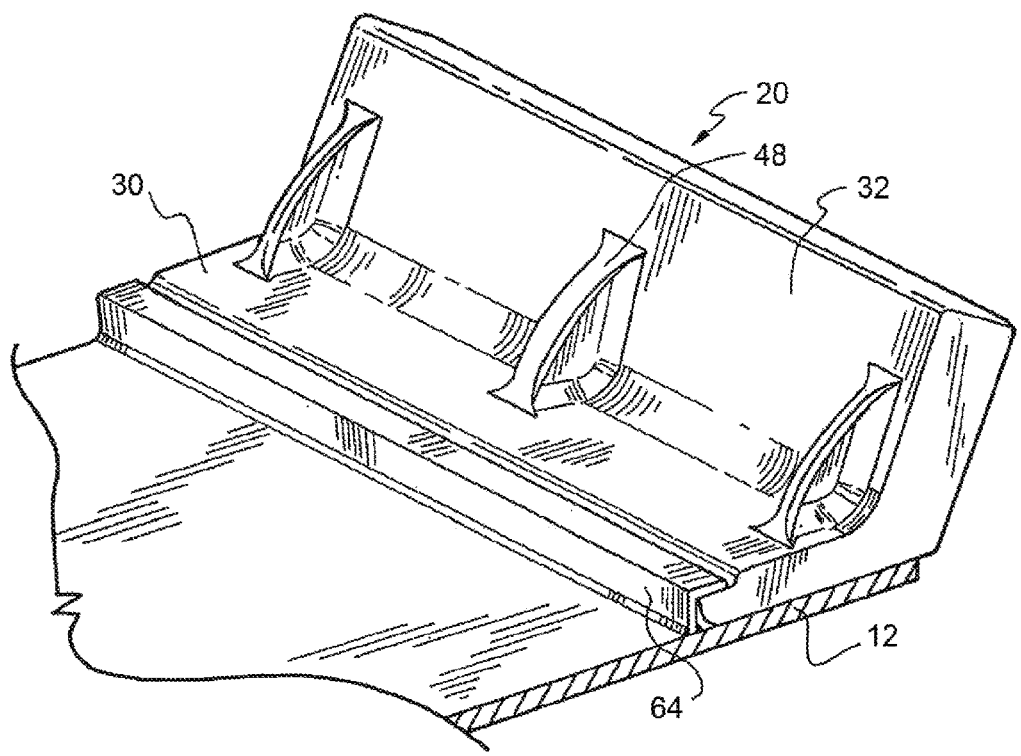
FIG. 6 is a top perspective view of the shelf and liner arrangement as shown in FIG. 4.
Figure 7:
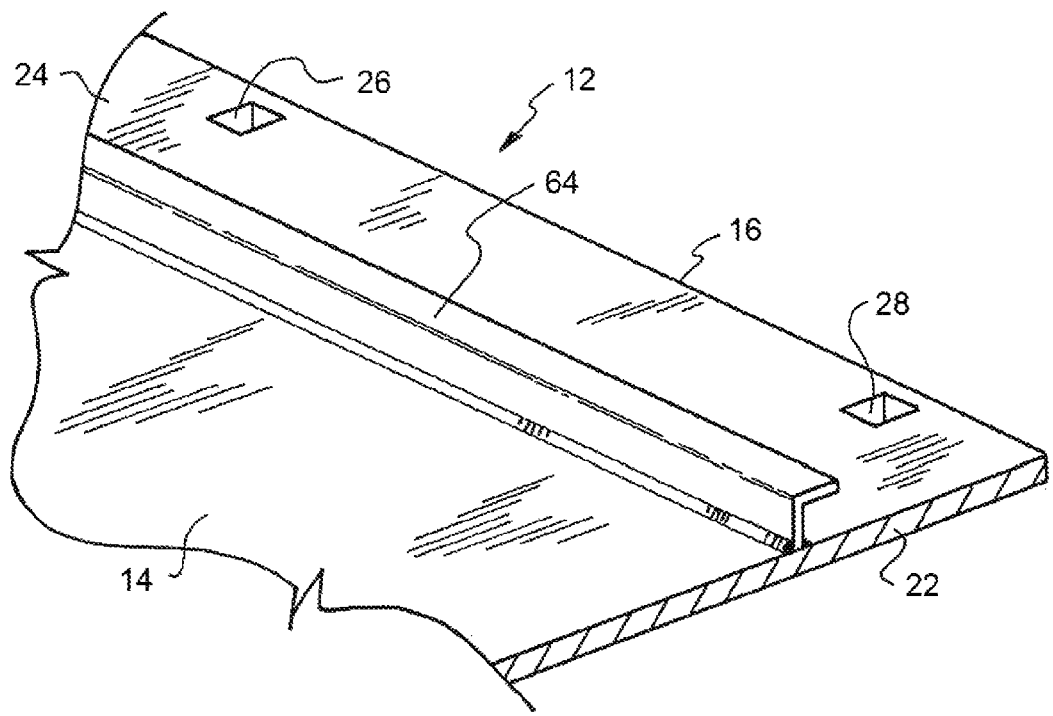
FIG. 7 is a top perspective view of the shelf of the arrangement shown in FIG. 4.

In the FIG. 4 embodiment, the two spaced mounting formations 40, 42 are configured so that the passage 39 through the mounting formations 40, 42 has an axis extending parallel to the inner and outer ends 14 and 16 of the shelf 12 and the chute liner 20 and also parallel to the longitudinal axis of the chute liner. That is, the axis extends transverse to the sides 35 and 37 of the chute liner 20.

In the illustrated embodiment shown in FIGS. 4 to 10, the mounting formations 40, 42 are formed integrally with the liner 20 and project downwardly from the operatively lower surface 33. As described, the mounting formations 40, 42 include a projecting part that projects down beneath the shelf 12 that forms the passage 39 through which the locking member 50 is passed.

Figure 8:
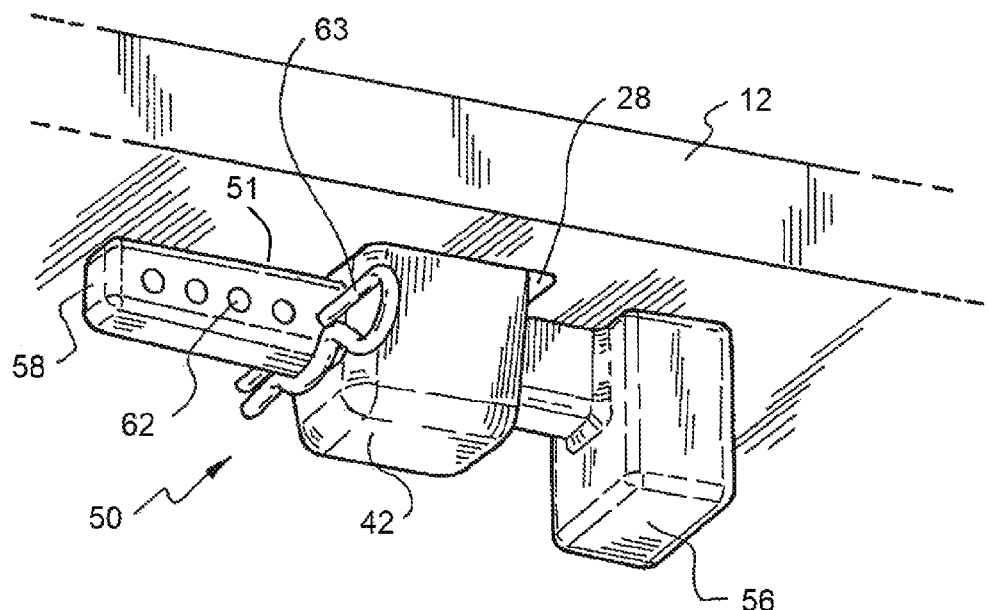
FIG. 8 is a detail drawing of the region A of the shelf and liner arrangement shown in FIG. 4.
Figure 9:
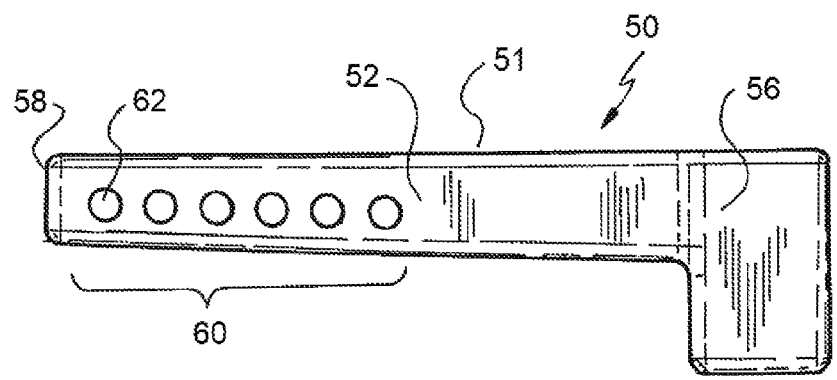
FIG. 9 is a front view of a locking member for the shelf and liner arrangement shown in FIG. 4.
Figure 10:
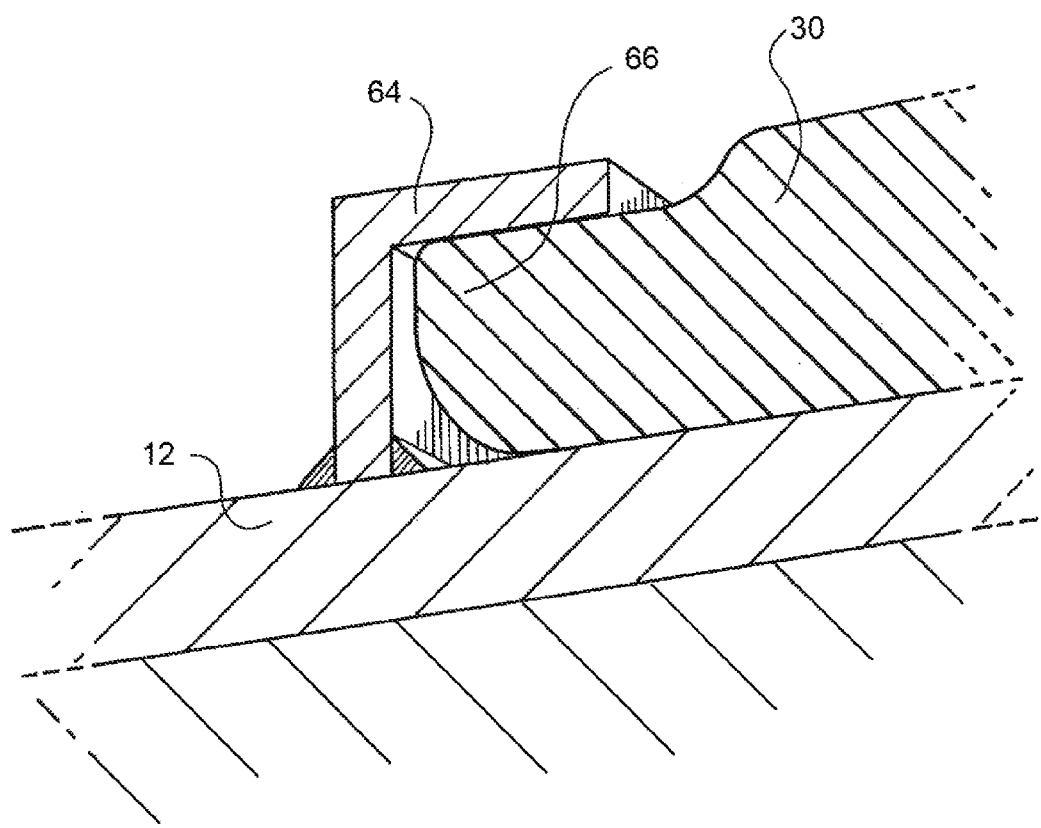
FIG. 10 is a detail drawing of the region B of the shelf and liner arrangement shown in FIG. 4.
Figure 11:
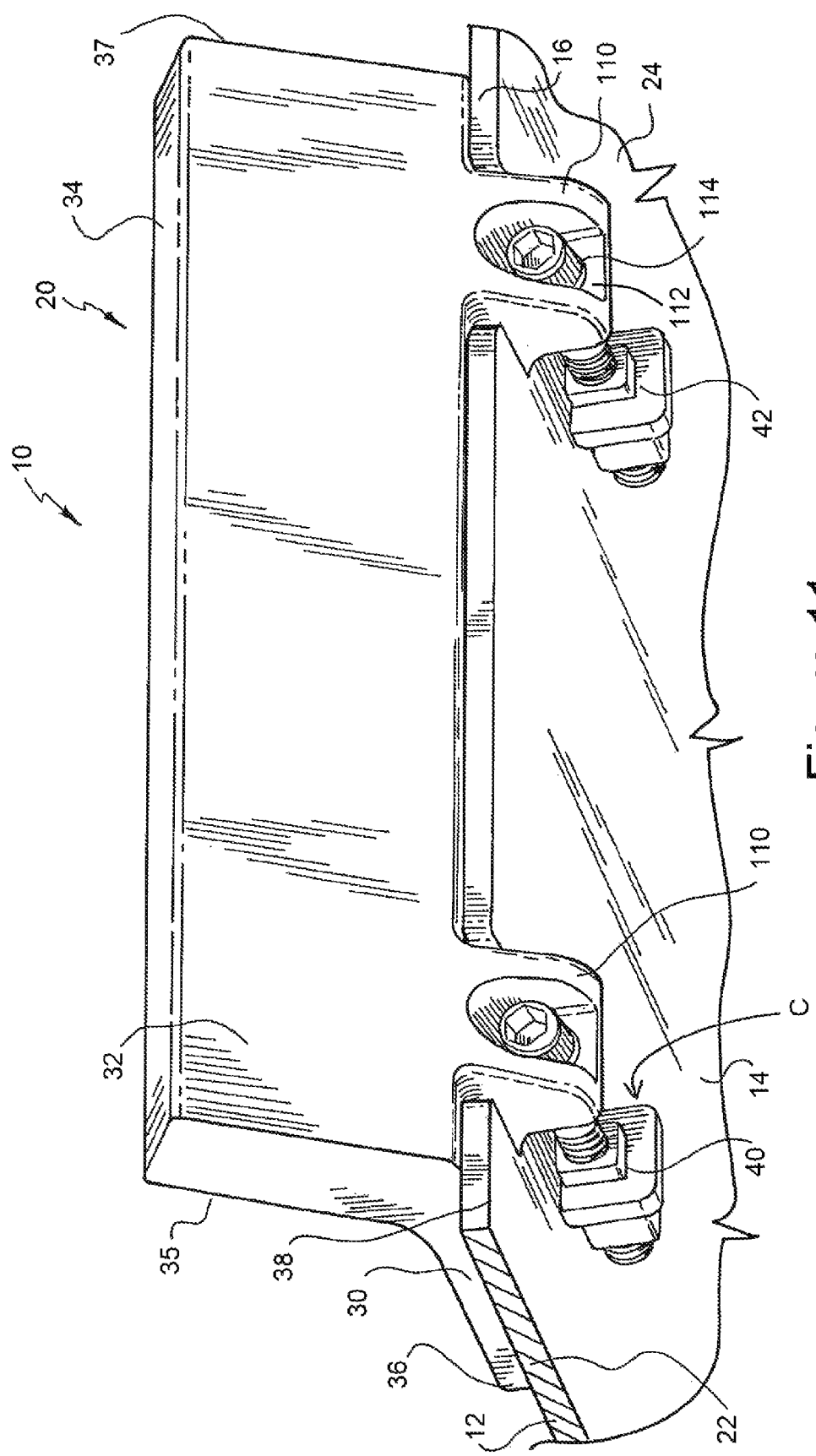
FIG. 11 is a bottom perspective view of a further shelf and liner arrangement in accordance with a second embodiment of the disclosure.
Figure 12:
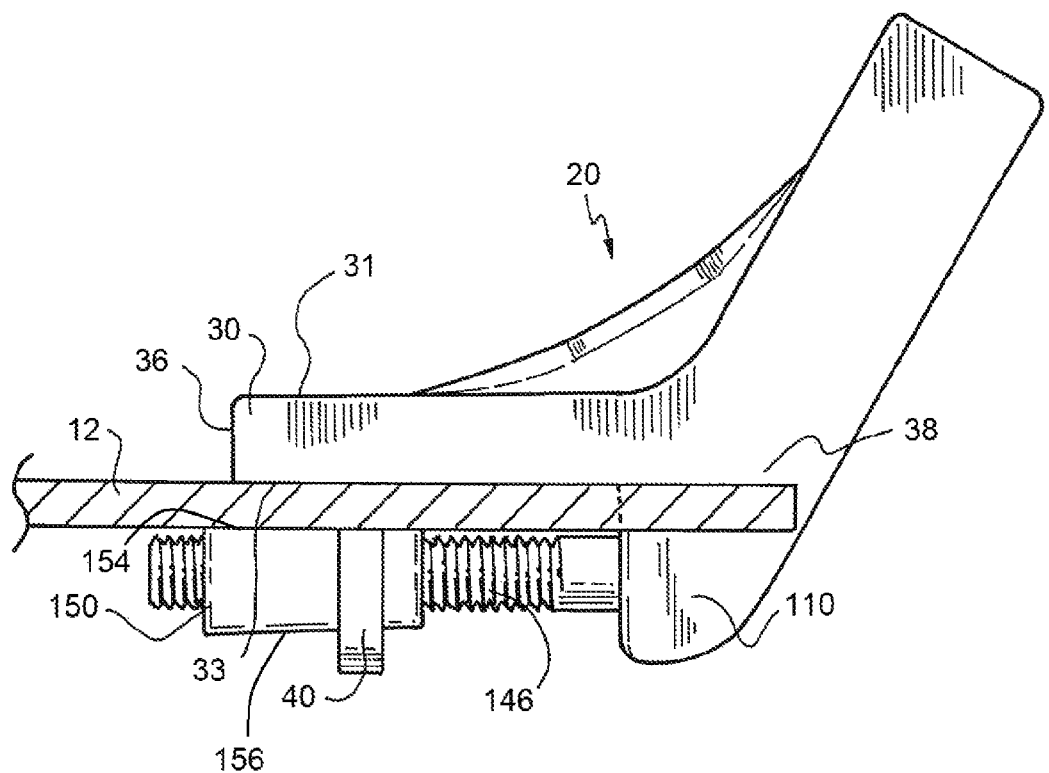
FIG. 12 is a side view of the shelf and liner arrangement as shown in FIG. 11.

The locking member 50 and its interaction with the passage 39 through the mounting formation 40, 42 will now be described in more detail with reference to FIG. 8.

The locking member 50 is elongate, and the tapered section thereof forms a wedge 52 that is received in the passage 39 of the mounting formation 40 and frictionally engages that part of the mounting formation 40 surrounding the passage 39. The locking member 50 has one end with an enlarged head 56 and an opposed smaller end 58 which can be displaced through the passage 39 with some clearance.

The locking member 50 may conveniently be formed of resilient material, e.g. polyurethane, that can undergo deformation when it is displaced, e.g. driven, into the passage 39. Deformation of the resilient material of member 50 creates a static frictional force between the locking member 50 and the shelf 12 which assists in resisting the locking member 50 from being withdrawn from the passage 39 of the mounting formations 40, 42. The deformed resilient material urges outwardly against the passage 39 increasing the frictional grip of the locking member 50.

In the illustrated embodiment, each passage 39 is formed by its associated mounting formation 40 or 42 and a bottom surface of the shelf 12. The passage 39 has four sides and the wedge 52 of the locking member 50 also has a complementary four-sided configuration. The tapering profile 52 of the locking member 50 is shown clearly in FIG. 9.

One side 51 of the wedge 52 extends parallel to the longitudinal axis of the locking member 50 and as shown in the drawings is arranged to bear up against the shelf 12. This configuration permits the locking member 50 to lie flat up against the underside of the shelf 12. The other three sides of the wedge 52 taper inwardly in a direction from one end of the locking member 50 to the smaller end 58 to achieve the wedge effect. In one embodiment, the wedge 52 may comprise a frustum or frusto-conical section of an oblique rectangular pyramid.

Additionally, the locking member 50 has a retaining arrangement indicated generally by reference numeral 60 towards the smaller end 58 for retaining the locking member 50 in its position. In the illustrated embodiment, the retaining arrangement 60 comprises several openings 62 formed through the locking member 50 at spaced intervals along its length towards the smaller opposed end 58. A clip 63, e.g. an R clip, can be inserted through one of the openings 62 to prevent the locking member 50 from being withdrawn from the locking formation 40 with which it is frictionally engaged. The clip 63 thus does not need to be in physical contact with the mounting formation and may be spaced apart therefrom.

Additionally, the shelf 12 has a shelf retainer 64 and the liner 20 has a base engagement formation 66 along its inner end 36 for holding the chute liner 20 in position down the shelf 12 during operation of the chute.

The shelf retainer 64 comprises an elongate member of constant cross section, e.g. in the form of an L-section, that extends a full length of the chute liner 20 and forms an elongate receptacle within which the base engagement formation 66 is received. In turn, the base engagement formation 66 is sized and configured be tightly and snugly received within the elongate receptacle formed by the shelf retainer 64 so that it is held down firmly on the shelf 12.

In use, a chute liner 20 is positioned on a shelf 12 with the mounting formations 40, 42 on the liner 20 aligned with the locking formation apertures 26, 28 formed in the shelf 12. The mounting formations 40, 42 are passed through the locking formation apertures 26, 28 in the shelf 12 so that the formations 40, 42, and in particular the part projecting down beneath the shelf 12 and defining the passage 39, can be accessed by a worker beneath the shelf 12 doing a liner swap and installation.

The locking member 50 is then passed through the passage 39 until the wedge 52 frictionally engages with the mounting formation 40 or 42. A stronger and more secure locking action can be achieved by hitting the head 56 of the locking member 50 with a hammer to drive the wedge 52 further into the passage 39. This increases the frictional locking force locking the locking members 50 to the mounting formations 40, 42.

This procedure is applied in reverse to remove a worn liner from a chute. The locking member 50 is withdrawn from the passage 39 by hitting a reverse side of the head 56 of the locking member 50 with a hammer. Once the locking member 50 has been removed, the mounting formations 40, 42 can be pushed upward and out through the locking formation apertures 26, 28 in the shelf 12 and then the base engagement formation 66 on the inner end 36 of the base 30 can be withdrawn from the shelf retainer 64 thereby separating the chute liner 20 from the shelf 12. The chute liner can then be replaced with a replacement chute liner in the manner described immediately above.

FIGS. 11 to 16 illustrate a shelf and chute liner arrangement in accordance with a second embodiment of the disclosure. The shelf and liner arrangement in the second embodiment, is conceptually similar to the first embodiment described above, and has many features in common with the first embodiment. Accordingly, unless otherwise indicated, the same reference numerals will be used to refer to the same components. The following description will focus on the differences between this second embodiment and the first embodiment.

In FIGS. 11 to 16, the shelf and chute liner arrangement, is indicated generally by reference numeral 10.

The shelf and liner arrangement comprises a shelf 12 having an inner end 14 mounted on a chute wall and a free outer end 16 spaced away from the chute wall, and a chute liner 20 mounted on the shelf 12.

The shelf 12 has two sides 22, 24 laterally spaced from each other joining the inner and outer ends 12 and 14, and the shelf 12 has two laterally spaced locking formation apertures 26, 28 formed therein. Additionally, the outer end 16 of the shelf 12 has two notches or cut outs 120 in its outer end 14 for interacting with the chute liner 20 as will be described below.

The chute liner 20 comprises a base 30 mounted on the shelf 12 and an arm 32 extending away from the base 30 to a free end 34 spaced away from the base 30. As with the first embodiment described above with reference to FIGS. 4 to 10, the base 30 has an operatively upper surface 31 that contacts material passing through the chute and an opposed operatively lower surface 33 that bears down against the shelf 12.

Further, the chute liner 20 has two mounting formations 40, 42 depending down from the operatively lower surface 33 of the base 30, with each mounting formation passing through a locking formation aperture 26 or 28 in the shelf 12 as with the first embodiment. Each mounting formation 40, 42 has a part, projecting down beneath the shelf 12, and defining a passage 39 which is used for locking the chute liner 20 to the shelf 12.

The chute liner 20 and the locking member 50 used in the second embodiment will now be described in more detail below.

In addition to the mounting formations 40, 42, the chute liner 20 has two linked further mounting formations 110 towards the outer end 38 of the base 30 of the chute liner 20. One said linked further mounting formation 110 is associated with said mounting formation 40, and the other linked further mounting formation 110 is associated with the other mounting formation 42.

Figure 13:
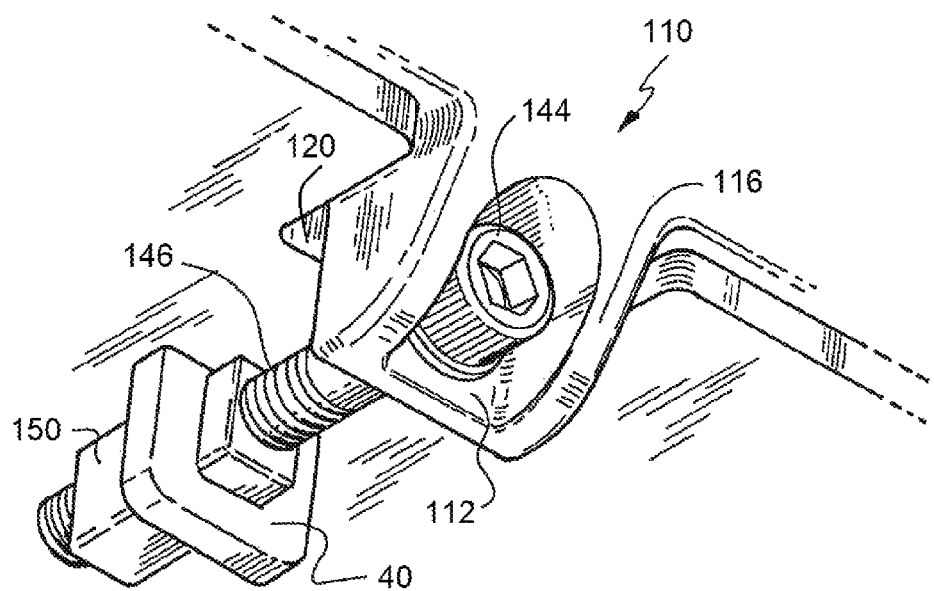
FIG. 13 is a schematic drawing showing the detail C of the shelf and liner arrangement shown in FIG. 11.
Figure 14:
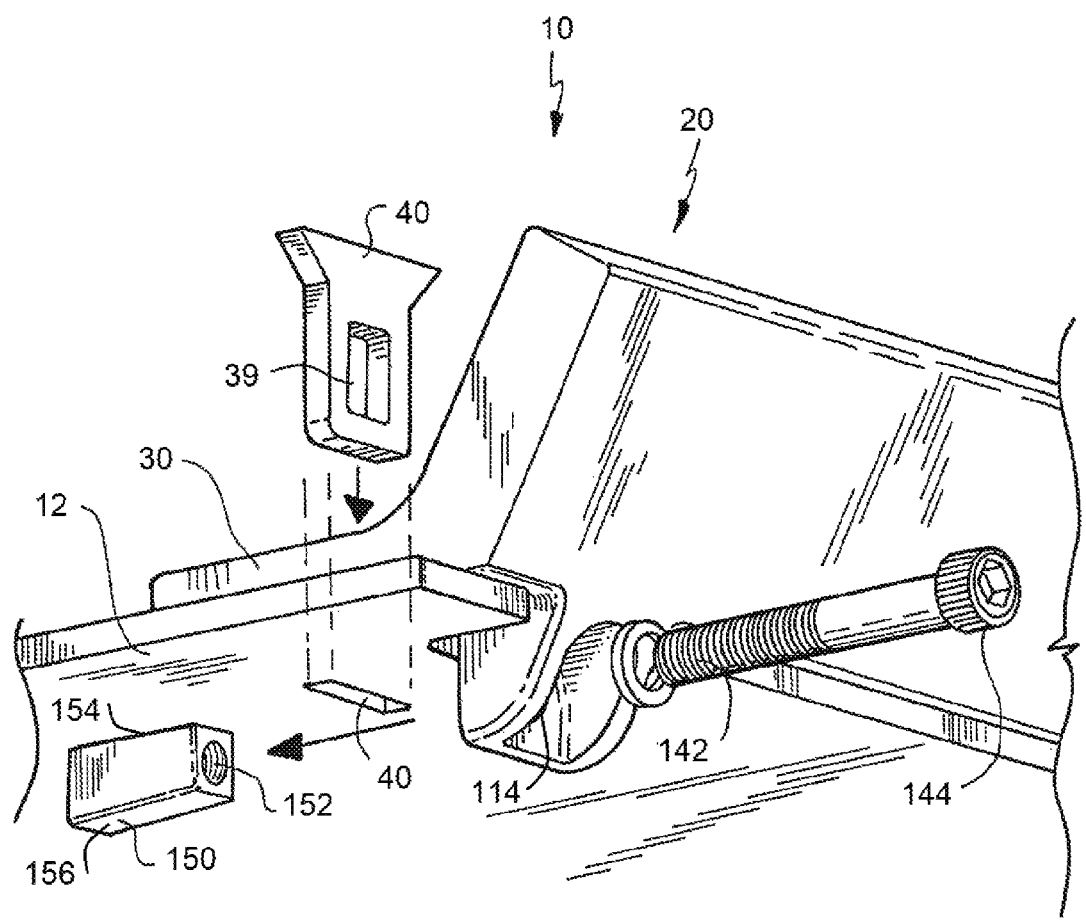
FIG. 14 is an exploded perspective view of the shelf and liner arrangement shown in FIG. 11.
Figure 15:
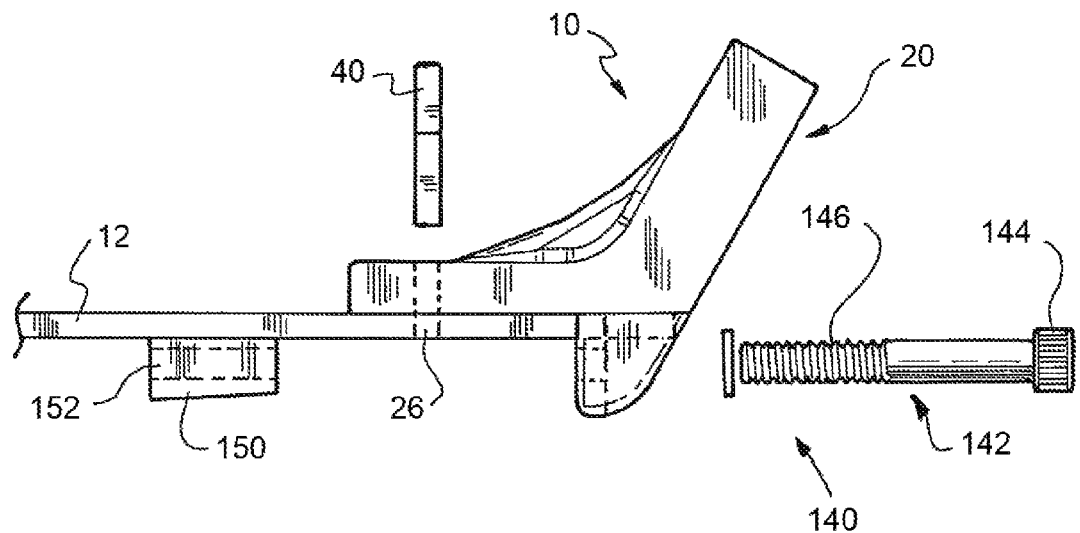
FIG. 15 is an exploded side view of the shelf and liner arrangement shown in FIG. 11.
Figure 16:
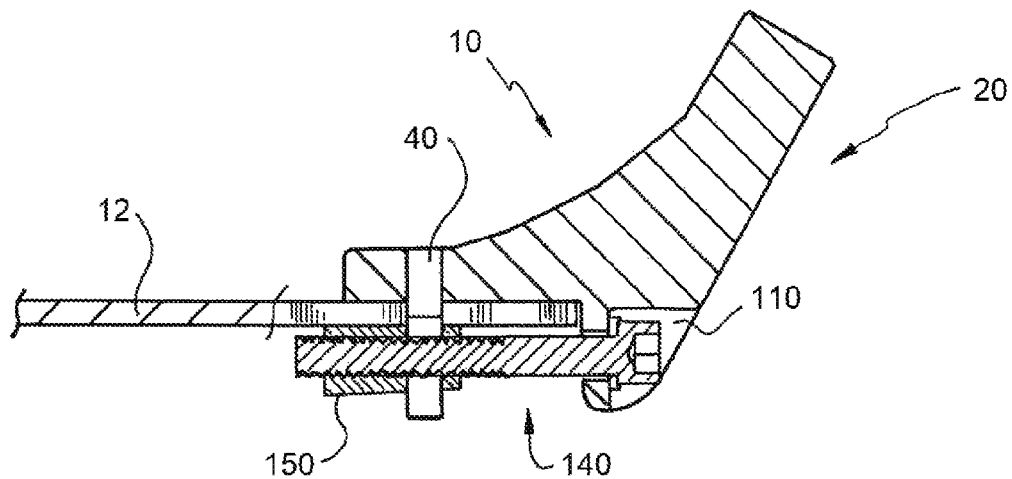
FIG. 16 is a cross-sectional view through the shelf and liner arrangement shown in FIG. 11, taken from the same side as FIG. 12.

Each linked further mounting formation 110 comprises a base wall 112 having a locking member aperture 114 formed therein through which a locking member which is indicated by the reference numeral 140 in these drawings can be passed. Each further mounting formation 110 also includes a protective wall 116 around the base wall 112. In the illustrated embodiment, the base wall 112 and protective wall 116 resemble a bracket integrally formed with the base 30 of the chute liner 20. The further mounting formations 110 are received within the cut outs 120 formed in the outer end of the shelf as shown in FIGS. 13 and 14.

In the second embodiment in FIGS. 11 to 16, the locking member 140 comprises a fastener 142 in combination with a separate block which in the drawings comprises a wedge 150 forming a bore 152 within which the fastener is engaged and received.

The fastener 142 has a head 144 at one end and a shank 146 extending from the head 144 having an external screw thread formed thereon or partially along the shank 146. The head 144 is positioned on a side of the locking member 114 that is remote from the mounting formation 42 and the shank 146 thereof is passed through the aperture 114 as shown in FIG. 13. The bore 152 of the wedge 150 defines an internal screw thread that engages with the screw thread on the shank 146 as shown in the drawings to form a mechanical lock.

Rotation of the fastener 142 in one direction draws the wedge 150 further into the passage 39 until a geometric lock is formed between the wedge 150 and the locking formation 40 locking the locking member 140 to the mounting formation 40. It will be appreciated that when in the locking position as shown in FIG. 14, it is not possible for the wedge 150 to be withdrawn from the locked position without rotation of the fastener 142 in the opposite direction.

The wedge 150 on the locking member 140 has four sides. One side 154 of the wedge 150 extends parallel to an axis of the locking member 140, and perpendicular to the head 144 of the fastener 142 for bearing up against an underside of the shelf 12. An opposed side 156 which in use is spaced away from the shelf 12 is tapered or inclined to achieve a wedging engagement with the mounting formation 40. In the illustrated embodiment, the other sides of the wedge 150 are also tapered to enhance the geometric lock.

The mounting formation 40, 42 that is formed on the chute liner 20 of the second embodiment is shown in FIG. 14. As illustrated in the drawings, the formation 40, 42 is formed separately to the chute liner 20 and comprises an upper part and a lower part. The upper part is largely received within the base of the chute liner 20 and a lower part of the mounting formation 40 passes through the shelf 12 and projects out beneath the shelf 12. The lower part defines the passage 39 into which the wedge 150 of the locking member 140 is passed.

The formations 40, 42 may be formed from the same material or a different material to that of the liner 20. In an alternative arrangement like the embodiment shown in FIGS. 4 to 6, the formations 40, 42 are formed integrally with the chute liner 20.

Further in the second embodiment, the passages 39 formed in the mounting formations 40, 42 extend in an axial direction from the outer end 16 of the chute liner to the inner end 14 of the chute liner 20. That is, they extend parallel to the sides 35, 37 of the chute liner 20 and transverse to the inner and outer ends 14 and 16. In particular, the passages 39 in the second embodiment extend transverse to the passages 39 and locking members 50 of the first embodiment which run parallel to the inner and outer ends of the chute liner.

In use, when the wedge 150 is in position received within the passage 39, the bore 152 formed in the wedge 150 is aligned with the aperture 114 in the further mounting formation 110. Thus, when a user inserts the shank end of the fastener 142, e.g. a bolt or screw, through the passage of mounting formation 110, the shank of the fastener 142 is aligned with the bore of the wedge 150 and can be screw threadedly received in the bore 152 of the wedge 150.

The fastener 142 can be turned by a user to advance the shank 146 into the wedge 150 until finger tight. The fastener, e.g. screw, 142 can then be mechanically tightened with a tool which draws the wedge 150 further into the passage 39. This provides a clamping force on the liner 20. A further clamping force is provided by the head 144 of the fastener 142 which is urged tightly against the base wall 112 of the further mounting formation 110.

In order to disengage the liner 20 for service and replacement, the fastener 142 is rotated in an opposite direction (to that for assembly) until the shank 146 of the fastener 142 is withdrawn from the threaded bore 152 within the wedge 150. Once the fastener 142 is withdrawn from the wedge 150 and the aperture 112, the wedge 150 can be withdrawn from the mounting formation 36 and the liner 20 can then be lifted off the shelf 12 and replaced.

It will be appreciated that the first and second embodiments of liner and shelf arrangements described above in the detailed description enable quicker and more efficient removal and replacement of liners when they are worn than with the prior art arrangements shown in FIGS. 1 to 3. The locking members can be accessed and removed by maintenance workers from beneath the shelf where they are not covered in rock material or damaged by rock material. They can be easily accessed beneath the shelf. Further, the operatively upper surface of the chute liners does not need to be cleared of material to gain access to the locking members for the purpose of withdrawing them from the chute liners and shelves.

The removal and replacement of chute liners may therefore be accomplished more quickly. This reduces the downtime for replacing the liners on chutes with shelves and it also reduces the cost of the labour resources used for liner replacement. This can lead to significant cost savings for plant and mine operators.

Further with the first and second embodiments described above, the locking members are more effectively shielded from contact with rock flow during operation of the chute. Thus, the locking arrangements are less likely to be damaged by broken rock material flowing through the chute than with the prior art arrangements illustrated in FIGS. 2 and 3.

Yet further, the embodiments described above with reference to the drawings provide effectively two points of attachment of the chute liner to the shelf in a direction extending from the inner to the outer ends of the liner. This helps the chute liner to withstand the stresses imposed on it during operation of the chute without lifting off the shelf.

It will be appreciated that various changes and modifications may be made to the inventions as described and claimed herein without departing form the sprit and scope thereof.

The invention claimed is:

1. A chute liner for mounting on a shelf of a chute with shelves including at least one locking formation aperture formed therein, the chute liner comprising:
a base for mounting on the shelf and an arm extending away from the base to a free end, the base having an operatively lower surface and an opposed operatively upper surface that contacts material passing through the chute, the base and the arm being configured to retain a portion of material passing through the chute thereon, at least one mounting formation depending from the operatively lower surface of the base that is in use passed through the locking formation aperture in the shelf, wherein the mounting formation forms a passage extending therethrough below the shelf, with one side of the passage being formed by a lower surface of the shelf; and
a locking member that is displaced into the passage of the mounting formation in use to operatively engage the mounting formation and lock the base to the shelf.

2. The chute liner according to claim 1, wherein the locking member has a tapered section that is complementary to the passage in the mounting formation, and operatively engages the mounting formation and the shelf.

3. The chute liner according to claim 2, wherein the passage has three sides formed by the mounting formation, and a fourth side formed by a lower surface of the shelf, and the locking member has one side that extends parallel to its longitudinal axis and bears against the fourth side of the passage.

4. The chute liner according to claim 3, wherein the tapered section of the locking member is wedge shaped and is made of a resilient material, and the locking member has a head at one end, and a smaller opposite end that is sized to be received in the passage with clearance.

5. The chute liner according to claim 4, wherein the locking member includes a retaining arrangement towards its opposite end that is passed through the locking member for retaining the locking member within the passage of the mounting formation.

6. The chute liner according to claim 1, wherein the chute liner further comprises a base engagement formation for engagement with a shelf retainer on the shelf to lock the chute liner down on the shelf during use of the chute.

7. The chute liner according to claim 1, wherein the chute liner comprises two laterally spaced sides having a longitudinal axis extending between the sides, and inner and outer ends joining the laterally spaced sides, and each said mounting formation is arranged with its passage extending parallel to the longitudinal axis of the chute liner.

8. The chute liner according to claim 1, including a linked further mounting formation closely spaced from and aligned with the or each mounting formation on the base, and having a locking member aperture formed therein receiving said locking member therethrough in use.

9. The chute liner according to claim 8, wherein the locking member comprises a fastener and a separate block that is releasably coupled to the fastener to mechanically lock the mounting formation to the shelf.

10. The chute liner according to claim 9, wherein the block is passed though the passage in the mounting formation, and the fastener is passed through the locking member aperture in the linked further mounting formation, and the block and fastener are releasably coupled to each other in a way that enables the block to be axially displaced relative to the fastener.

11. The chute liner according to claim 10, wherein the fastener has a head that is retained by the locking member aperture on the linked further mounting formation and a shank having a screw thread formed thereon, and the block defines an internal bore having an internal screw thread that receives the screw thread on the fastener to enable axial displacement of the block relative to the fastener.

12. The chute liner according to claim 10, wherein the block is configured in the form of a wedge, and rotation of the fastener draws the block into the passage in the mounting formation to tightly engage the mounting formation and lock the chute liner to the shelf.

13. The chute liner according to claim 8, wherein the chute liner comprises two laterally spaced sides having a longitudinal axis extending between the sides, and inner and outer ends joining the laterally spaced sides, and the or each mounting formation is arranged with its passage extending transverse to the longitudinal axis of the chute liner.

14. A shelf and liner arrangement for a chute with shelves, the shelf and liner arrangement comprising:

a shelf having an inner end mounted on a chute wall and a free outer end spaced away from the chute wall, the shelf having at least one locking formation aperture formed therein; and a chute liner mounted on the shelf, comprising:

a base mounted on the shelf and an arm extending away from the base to a free end, the base having an operatively lower surface and an opposed operatively upper surface that contacts material passing through the chute, the base and the arm being configured to retain a portion of material passing through the chute thereon during operation of the chute, at least one mounting formation depending from the operatively lower surface of the base that is in use passed through the locking formation aperture in the shelf, wherein the mounting formation forms a passage extending therethrough below the shelf, with one side of the passage being formed by a lower surface of the shelf; and a locking member received in the passage and operatively engaging the mounting formation to lock the chute liner to the shelf.

15. The shelf and liner arrangement according to claim 14, wherein the locking member has a tapered section that is complementary to the passage in the mounting formation and operatively engages the mounting formation and the shelf.

16. The shelf and liner arrangement according to claim 15, wherein the passage has three sides formed by the mounting formation, and a fourth side formed by a lower surface of the shelf, and the locking member has one side extending parallel to its longitudinal axis and bearing against the fourth side of the passage.

17. The shelf and liner arrangement according to claim 15, wherein the tapered section of the locking member is wedge shaped and is made of a resilient material, and the locking member has a head at one end and a smaller opposite end that is sized to be received in the passage with clearance.

18. The shelf and liner arrangement according to claim 14, wherein the shelf includes a liner retainer spaced from its free outer end, and the chute liner further includes a base engagement formation on the base, the base engagement formation being engaged by the liner retainer and held down on the shelf to assist in locking the chute liner on the shelf.

19. The shelf and liner arrangement according to claim 18, wherein the liner retainer comprises a channel member extending from one side of the shelf to the other and the base engagement formation is received in the channel member.

20. The shelf and liner arrangement according to claim 14, including a linked further mounting formation closely spaced from and aligned with the or each mounting formation on the base, the linked further mounting formation having a locking member aperture formed therein through which said locking member which is received in the passage of the mounting formation is passed.

21. The shelf and liner arrangement according to claim 20, wherein the locking member comprises a fastener and a separate block that is releasably coupled to the fastener to mechanically lock the mounting formation to the shelf.

22. The shelf and liner arrangement according to claim 21, wherein the block is passed though the passage of the mounting formation, and the fastener is passed through the locking member aperture, and the block and fastener are releasably coupled to each other such that the block can be axially displaced relative to the fastener.

23. A method for fitting a chute liner to a shelf of a chute, the method comprising:

providing a chute liner according to claim 1;

mounting the chute liner in position on the shelf with the at least one mounting formation passed through the at least one locking formation aperture; and passing a locking member into the passage of the or each mounting formation, and operatively engaging the locking member with the or each mounting formation to lock the chute liner in position on the shelf during operation of the chute.

\* \* \* \* \*